(12) United States Patent
Wang et al.

(10) Patent No.: US 11,650,304 B2
(45) Date of Patent: May 16, 2023

(54) SLIM OBJECT DETECTION USING MULTI-POLARIZED RADAR SIGNALS

(71) Applicant: TEXAS INSTRUMENTS INCORPORATED, Dallas, TX (US)

(72) Inventors: Dan Wang, Allen, TX (US); Meysam Moallem, Plano, TX (US); Brian Ginsburg, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 252 days.

(21) Appl. No.: 17/019,509

(22) Filed: Sep. 14, 2020

(65) Prior Publication Data
US 2020/0408893 A1 Dec. 31, 2020

Related U.S. Application Data

(63) Continuation of application No. 15/699,186, filed on Sep. 8, 2017, now Pat. No. 10,782,394.

(60) Provisional application No. 62/456,479, filed on Feb. 8, 2017.

(51) Int. Cl.
G01S 13/44 (2006.01)
G01S 7/02 (2006.01)
G01S 7/35 (2006.01)
G01S 13/50 (2006.01)
G01S 13/87 (2006.01)
G01S 13/34 (2006.01)
G01S 13/931 (2020.01)
G01S 13/933 (2020.01)

(52) U.S. Cl.
CPC ............ *G01S 13/449* (2013.01); *G01S 7/024* (2013.01); *G01S 7/025* (2013.01); *G01S 7/026* (2013.01); *G01S 7/354* (2013.01); *G01S 13/50* (2013.01); *G01S 13/878* (2013.01); *G01S 13/346* (2013.01); *G01S 13/931* (2013.01); *G01S 13/933* (2020.01)

(58) Field of Classification Search
None
See application file for complete search history.

(56) References Cited

U.S. PATENT DOCUMENTS

| 3,772,689 | A | | 11/1973 | Root, Jr. |
| 3,909,827 | A | | 9/1975 | Tricoles |
| 4,035,797 | A | * | 7/1977 | Nagy ..................... G01S 7/025 |
| | | | | 342/361 |
| 4,106,014 | A | | 8/1978 | Dunn |

(Continued)

OTHER PUBLICATIONS

Jurgen Hasch et al., "Millimeter-Wave Technology for Automotive Radar Sensors in the 77 GHz Frequency Band," IEEE Transactions on Microwave Theory and Techniques, vol. 60, No. 3, Mar. 2012 (16 pages).

(Continued)

*Primary Examiner* — Bernarr E Gregory
(74) *Attorney, Agent, or Firm* — Michael T. Gabrik; Frank D. Cimino

(57) ABSTRACT

A millimeter or mm-wave system includes transmission of a millimeter wave (mm-wave) radar signal by a transmitter to an object. The transmitted mm-wave radar signal may include at least two signal orientations, and in response to each signal orientation, the object reflects corresponding signal reflections. The signal reflections are detected and a determination is made as to location of the object.

20 Claims, 5 Drawing Sheets

(56) References Cited

U.S. PATENT DOCUMENTS

| | | | |
|---|---|---|---|
| 4,490,719 A | 12/1984 | Botwin et al. | |
| 5,227,800 A | 7/1993 | Huguenin et al. | |
| 5,486,832 A | 1/1996 | Huldeman | |
| 5,920,285 A | 7/1999 | Benjamin | |
| 7,167,123 B2 | 1/2007 | Hausner et al. | |
| 7,202,941 B2 | 4/2007 | Munro | |
| 7,262,729 B1 | 8/2007 | Hershey et al. | |
| 7,355,546 B2 | 4/2008 | Randall | |
| 7,492,303 B1 * | 2/2009 | Levitan | G01S 7/024 342/188 |
| 7,596,354 B2 * | 9/2009 | Schiff | H04B 7/10 343/702 |
| 7,825,847 B2 | 11/2010 | Fujimura | |
| 7,839,321 B2 | 11/2010 | Huang et al. | |
| 7,982,661 B2 | 7/2011 | Beasley | |
| 7,994,965 B2 | 8/2011 | Longstaff | |
| 8,077,074 B2 | 12/2011 | Venkatachalam et al. | |
| 8,427,360 B2 | 4/2013 | Longstaff | |
| 8,558,735 B2 | 10/2013 | Bachmann et al. | |
| 9,086,501 B2 | 7/2015 | Beer et al. | |
| 9,330,330 B2 | 5/2016 | Karam et al. | |
| 9,348,022 B1 | 5/2016 | Tomcsak et al. | |
| 10,067,226 B2 | 9/2018 | Bowring et al. | |
| 10,088,564 B2 | 10/2018 | Longstaff et al. | |
| 10,782,394 B2 * | 9/2020 | Wang | G01S 7/025 |
| 2005/0062640 A1 * | 3/2005 | Edwards | G01S 7/025 342/51 |
| 2016/0025839 A1 * | 1/2016 | Trummer | G01S 13/931 342/188 |
| 2016/0138946 A1 | 5/2016 | Grau | |

OTHER PUBLICATIONS

International Search Report and Written Opinion, PCT/US2018/017331, dated May 10, 2018 (7 pages).
Migliaccio et al, "Milimeter-Wave Radar for Rescue Helicopters", 2006 IEEE, ICARCV 2006.
Kamal Sarabandi, "Milimeter-Wave Radar Phenomenology of Power Lines and a Polarimetric Detection Algorithm", IEEE, Transactions on Antennas and Propagation, vol. 47, No. 12, Dec. 1999.
European Search Report dated Dec. 20, 2019.

* cited by examiner

SLIM OBJECT DETECTION USING MULTI-POLARIZED RADAR SIGNALS

RELATED APPLICATIONS

This application is a continuation of U.S. patent application Ser. No. 15/699,186 filed Sep. 8, 2017, now U.S. Pat. No. 10,782,394 which claims the benefit of priority of U.S. Provisional Patent Application No. 62/456,479 filed Feb. 8, 2017, each of which is herein incorporated by reference in its entirety.

BACKGROUND

Radar systems have been used by commercial, private, and military sectors to detect presence and track locations of relatively large, fast moving targets. For example, the radar systems have been used to track targets such as rockets, people, automobiles, aircraft, etc. However, detecting of very small and slow moving targets at short distances, and in the presence of high background clutter or noise, has not been a high priority. There have been a number of attempts to design a radar system to detect the small and slow moving targets and these attempts have been unreliable for number of reasons.

First, a use of a pulse radar to detect and track small and slow moving targets have been limited by radar cross section of the target, which is very small, and any background noise may tend to blind the radar. The pulse radar has a minimum range, and the limited radar cross section of the target may further limit the detection and tracking of the target. Secondly, use of a Continuous Wave (CW) Doppler Radar is efficient for a particular configuration of the target; however, the CW Doppler Radar is limited by surrounding noise when detecting small and fast moving objects.

Synthetic Aperture Radar (SAR) uses multiple polarization antennas. SAR systems typically may be used satellite or large scale aircraft. SAR systems rely on accurately known/determined motion information, which may be provided by a sensor of an antenna carrier to achieve high image resolution. The information from co- and cross-polarization is combined for object classification. It is desirable to provide for a standalone system without use of a separate sensor to provide information regarding co- and cross-polarization. SAR systems further require a specific processing of polarization channels. The higher SNR channel between two different polarization channels is used for object detection and localization.

SUMMARY

Described herein is a technology for a millimeter or mm-wave detection and particularly, a mm-wave system for detecting slim, fine, and small objects during a dense weather condition and noisy environment. The mm-wave system, for example, may include a plurality of transmitters for transmission of a mm-wave radar signal to an object. The transmitted mm-wave radar signal may include at least two signal orientations such as at least one horizontally polarized signal, and at least one vertically polarized signal, which may be transmitted by different transmitters with corresponding different pre-configured fixed polarizations. In response to each signal orientation, the object may reflect signals that correspond to each of the at least two signal orientations. Based on the reflected signals, a processor may determine the signal orientation that may include a highest signal to noise ratio (SNR), higher signal magnitude, and the like, and utilize the determined signal orientation to detect and determine location of the object.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Figure 1:
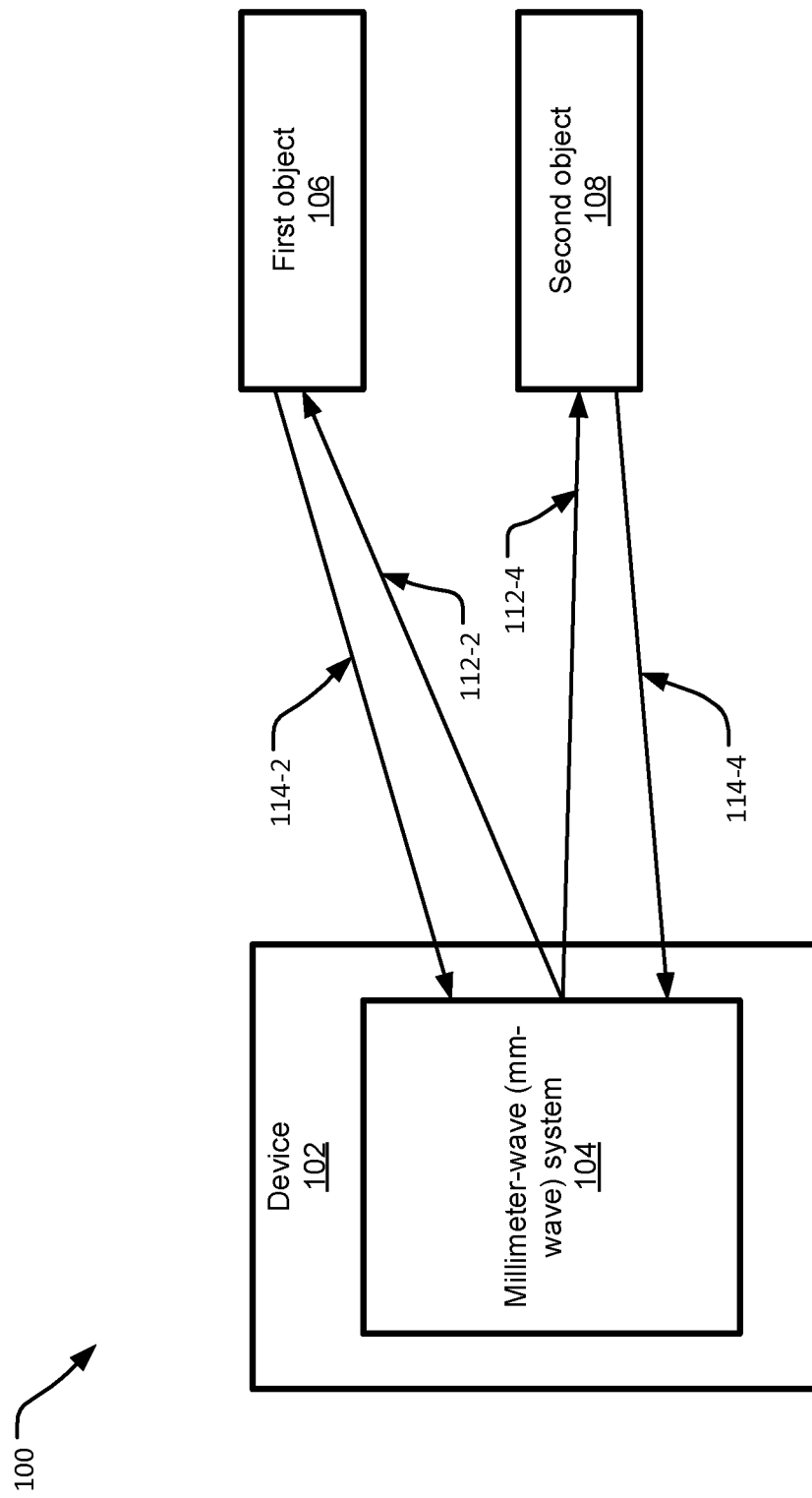
FIG. 1 is an example scenario illustrating an example application of a millimeter-wave (mm-wave) system as described herein.

FIG. 1 is an example scenario 100 illustrating an example application of a mm-wave system as described herein. As shown, the scenario 100 includes, for example, a device 102 with a mm-wave system 104, a first object 106, a second object 108, transmitted mm-wave radar signals 112, and reflected return-mm-wave radar signals 114.

The device 102, for example, may be remotely controlled and includes remote-controlled sensors and camera systems such as the mm-wave system 104, digital cameras, etc. Although the remote controlled device 102, for example, may use the installed digital cameras to perform a three dimensional (3D) survey of a particular area during an operation, the installed digital cameras may be limited by size and dimensions of the objects (i.e., first object 106 and/or second object 108) to be detected and by surrounding weather conditions. In this example, the device 102 may be a bomb disposal robot, a drone, an automobile, a toy, or a machine that may require detection of miniature or thin objects as further described below.

As opposed to digital cameras, the mm-wave system 104 may be configured, for example, to transmit W band (75-110 GHz) mm-wave radar signals to detect and determine locations of small and thin first object 106 and/or second object 108 on a dense weather conditions and in a noisy environment. The small and thin objects may include electrical wires, metallic cables, thin plastic wires, skinny rubber cables, fine mesh wires, and the like. In this example, the mm-wave system 104 may operate at the W band (75-110 GHz) and particularly, at 76-81 GHz range in transmitting the mm-wave radar signals using different combinations of transmission polarizations i.e., horizontal and/or vertical polarizations. In this example still, the mm-wave system 104 may use the same channel for transmission and receiving of mm-wave radar signals.

The mm-wave system 104 transmits, for example, the W band-mm-wave radar signals 112-2 to the direction of the first object 106. In response to this transmission, the mm-wave system 104 may receive return-mm-wave radar signals 114-2 from the first object 106 using the same transmission channel. In this example, the transmitted mm-wave radar signals 112-2 may have at least two signal orientations such as one horizontal signal polarization and one vertical signal polarization that may be transmitted by different transmitters with different pre-configured fixed polarizations. In this case, the received return-mm-wave radar signals 114-2 may include signal reflections that correspond to each signal orientation of the transmitted mm-wave radar signals 112.

Similarly, the mm-wave system 104 transmits, for example, the transmitted mm-wave radar signals 112-4 to the direction of the second object 108 and in response to this transmission, the mm-wave system 104 may receive the return-mm-wave radar signals 114-4 from the second object 108.

In the examples above, the mm-wave system 104 may be configured to use the received return-mm-wave radar signals 114-2 and 114-4 in order to detect presence of the first object 106 and the second object 108, respectively. Furthermore, the mm-wave system 104 may be configured to determine and utilize the signal orientation that may facilitate efficient identification of the location and distance of the first object 106 and/or second object 108 from the device 102. For example, the mm-wave system 104 may include receivers with different pre-configured fixed polarizations. In this example, each receiver with a particular pre-configured fixed polarization may receive the return-mm-wave radar signals 114 based on the signal orientation of the source-mm-wave radar signals 112. In this example still, the mm-wave system 104 may use the signal orientation with highest signal to noise (SNR) ratio in identifying the location and distance of the first object 106 and/or second object 108 from the device 102.

Figure 2:
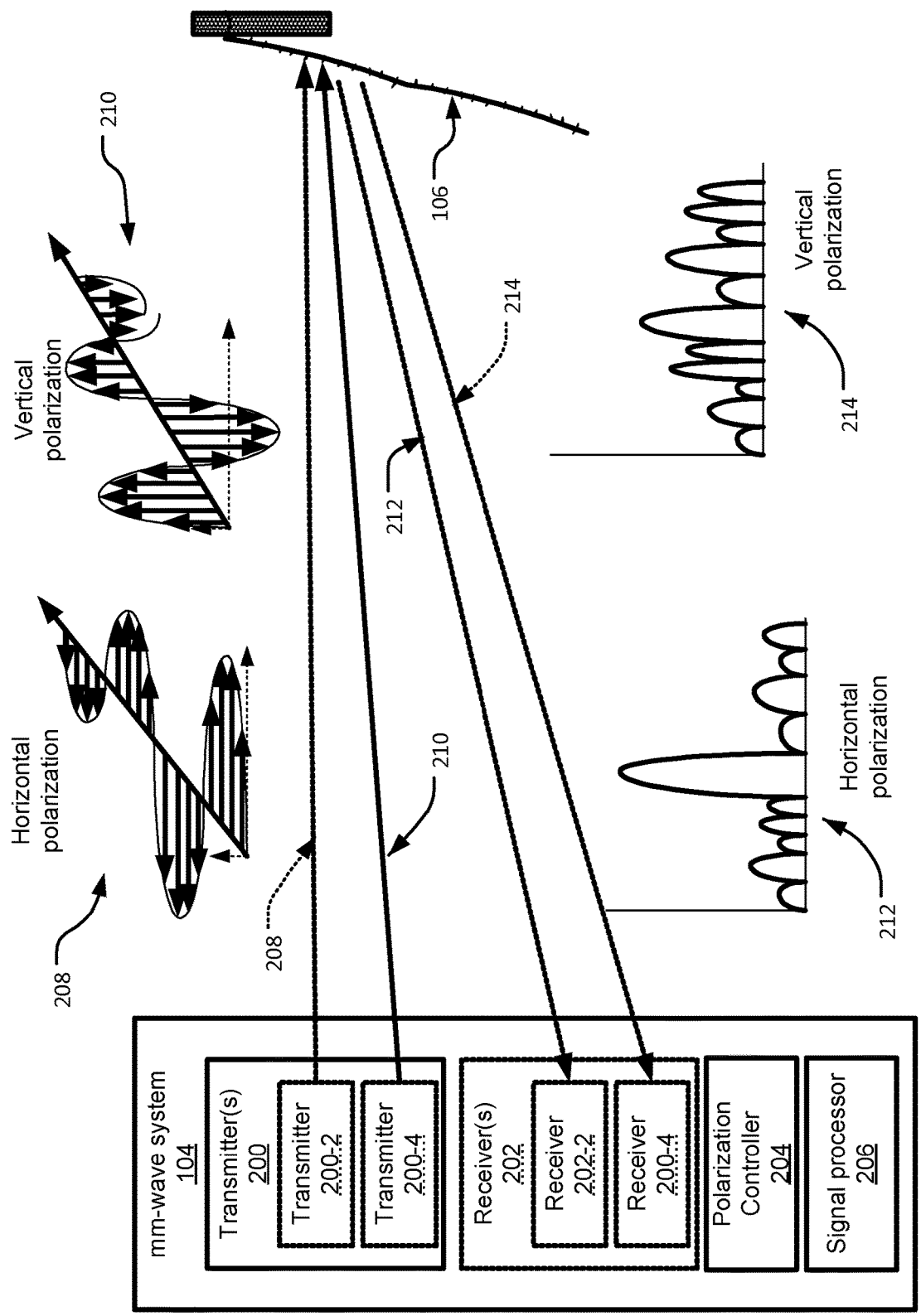
FIG. 2 illustrates an example mm-wave system as described in present implementations herein.

Although the example basic block diagram of the device 102 illustrates in a limited manner the basic components, other components such as processors, storage, applications, memory, etc. were not described in order to simplify the embodiments described herein FIG. 2 illustrates an example mm-wave system 104 as described in present implementations herein. As shown, the example mm-wave system 104 may include a plurality of transmitters 200, a plurality of receivers 202, a polarization controller 204, and a signal processor 206. Furthermore, FIG. 2 shows a horizontally polarized mm-wave radar signal 208 and a vertically polarized mm-wave radar signal 210 that may be transmitted by a first transmitter 200-2 and a second transmitter 200-4, respectively. Furthermore, FIG. 2 shows a horizontal polarization reflection signal 212 and a vertical polarization reflection signal 214 that correspond to the transmitted horizontally polarized mm-wave radar signal 208 and the vertically polarized mm-wave radar signal 210, respectively. The horizontal polarization reflection signal 212 and the vertical polarization reflection signal 214 may be received by a first receiver 202-2 and a second receiver 202-4, respectively, of the plurality of receivers 202.

Each transmitter and receiver of the plurality of transmitters and receivers, respectively, in FIG. 2 may be pre-configured, for example, to have a fixed polarization. For example, the first transmitter 200-2 and the second transmitter 200-4 may be pre-configured to have horizontal and vertical polarizations, respectively. Similarly, the first receiver 202-2 and the second receiver 202-4 may be pre-configured to have horizontal and vertical polarizations, respectively. In this example, the first receiver 202-2 and the second receiver 202-4 may be configured to receive the transmitted mm-wave signals from the first transmitter 200-2 and the second transmitter 200-4, respectively.

As described herein, the plurality of transmitters 200 may be configured to operate at 76-81 GHz spectrum in transmitting the horizontally polarized mm-wave radar signal 208 and the vertically polarized mm-wave radar signal 210 using at least two different transmitters with pre-configured fixed polarizations. The at least two different transmitters, for example, may be coupled to corresponding transmitter antenna (not shown). Furthermore, although the plurality of transmitters 200 in FIG. 2 shows a couple of different transmitters in transmitting the mm-wave radar signals using at least two different signal orientations i.e., horizontal and vertical polarizations, additional number of transmitters with pre-configured fixed polarizations may be added and utilized without affecting the implementations described herein.

The horizontally polarized signals 208 may include antenna electric fields that are parallel to Earth's surface while the vertically polarized signals 210 may include antenna electric fields that are perpendicular to the Earth's surface. The horizontally polarized signals 208 may be transmitted by the first transmitter 200-2, while the vertically polarized signals 210 may be transmitted by the second transmitter 200-4.

The transmitted horizontally polarized mm-wave radar signal 208 and the vertically polarized mm-wave radar signal 210 may be received and reflected by the first object 106 as horizontal polarization reflection signal 212 and vertical polarization reflection signal 214, respectively. For example, a thin barbed wire—first object 106 may receive the horizontally polarized signals 208 of the mm-wave radar signals 112-2 form the first transmitter 200-2. In this example, the thin barbed wire—first object 106 may reflect the horizontal polarization reflection signal 212 in response to the received horizontally polarized signals 208 of the mm-wave radar signals 112-2.

Similarly, the thin barbed wire—first object 106, for example, may receive the vertically polarized signals 210 of the mm-wave radar signals 112-2 from the second transmitter 200-4. In this example, the thin barbed wire—first object 106 may reflect the vertical polarization reflection signal 214 in response to the received vertically polarized signals 210 of the mm-wave radar signals 112-2.

In an implementation, and in an example configuration where the thin barbed wire—first object 106 is positioned orthogonally with the vertically polarized signals 210 from the second transmitter 200-4, the vertical polarization reflection signal 214 may have a lower signal to noise ratio (SNR) and lower reflected signal magnitudes as compared to the horizontal polarization reflection signal 212. That is, the horizontal polarization reflection signal 212 may provide a better signal reflection (i.e., higher SNR) for determining presence, location, and distance of the thin barbed wire—first object 106 as compared the vertical polarization reflection signal 214.

The plurality of receivers 202 may include the first receiver 202-2 and the second receiver 202-4 in receiving the horizontal polarization reflection signal 212 and the vertical polarization reflection signal 214, respectively. The at least two receivers may be coupled to corresponding receiver antenna (not shown). Furthermore still, although the plurality of receivers 202 in FIG. 2 shows a couple of different receivers in receiving the return-mm-wave radar signals using at least two different signal orientations i.e., horizontal and vertical polarizations, additional number of receivers with pre-configured fixed polarizations may be added and utilized without affecting the implementations described herein.

The polarization controller 204 may be coupled to the plurality of transmitters 200 and the plurality of receivers 202. For example, the polarization controller 204 may be configured to choose the transmitter (i.e., first transmitter 200-2 or second transmitter 200-4) from the plurality of transmitters 200 to use for the signal transmission, and the receiver (i.e., first receiver 202-2 or second receiver 202-4) from the plurality of receivers 202 for the signal reception. In this example, the chosen signal polarization of the receiver at the receiver side may correspond to the signal polarization of the transmitter at the transmitting side.

In an implementation, the plurality of transmitters 200 may include the transmitter antennas that convert mm-wave RF electric current into electromagnetic waves, which are radiated into space. In this implementation, the polarization controller 204 may be configured to choose the transmitter with a particular signal polarization configuration for transmitting the mm-wave RF electric current into space. Similarly, during reception, the polarization controller 204 may be configured to choose the receiver with a particular signal polarization configuration for receiving the reflected signal. Each transmitter and receiver of the plurality of transmitters and receivers, respectively, for example, may include a switch that may be controlled by the polarization controller 204.

The polarization controller 204 may further facilitate different sequence-combinations of the signal polarizations of the mm-wave radar signals 112-2. For example, the polarization controller 204 may switch in sequence the first transmitter 200-2 and the second transmitter 200-4 to initially transmit the mm-wave radar signals 112-2 in an alternating horizontal and vertical signal polarizations fashion. Thereafter, the polarization controller 204 may utilize the horizontal or the vertical signal polarization based upon their corresponding SNR as seen at the receiver side. In this example, the signal polarization with the better SNR, magnitude, and the like, may be utilized to determine the distance and location of the first object 106.

The signal processor 206 may be configured to process the received horizontal polarization reflection signal 212 and the vertical polarization reflection signal 214. For example, the signal processor 206 may determine which reflected signal between the horizontal polarization reflection signal 212 and the vertical polarization reflection signal 214 may include a higher SNR. In this example, the signal polarization with the higher SNR (i.e., horizontal polarization reflection signal 212 or the vertical polarization reflection signal 214) may be utilized by the signal processor 206 to determine the distance and location of the first object 106. In this example still, the signal processor 206 may send control signals that may be received by the polarization controller 204 in order to change the alternating signal polarization or orientation into a single signal orientation.

For example, as shown in FIG. 2, the barbed wire—first object 106 may reflect the horizontal polarization reflection signal 212 and the vertical polarization reflection signal 214, which correspond to the horizontally polarized signals 208 and vertically polarized signals 210, respectively. In this example, the horizontal polarization reflection signal 212 may include a signal that produces a higher signal peak value or higher signal magnitude and a higher SNR as compared to the vertical polarization reflection signal 214 on a particular sampling rate. As such, the signal processor 206 may use the horizontal polarization reflection signal 212 in the determination of the location of the first object 106.

As described herein, the signal processor 206, for example, may utilize a pre-defined SNR-threshold in determining the reflected signal that may be used to determine location and distance of the first object 106. The pre-defined SNR-threshold may include a SNR value that may be used to differentiate between reflected signals of different signal orientations. For example, the signal processor 106 may compare the horizontal polarization reflection signal 212 and the vertical polarization reflection signal 214 to the SNR pre-defined SNR threshold. In this example, the signal processor 106 may reject or accept the signal reflection to be used for determining the presence and distance of the reflecting object such as the first object 106.

Figure 3:
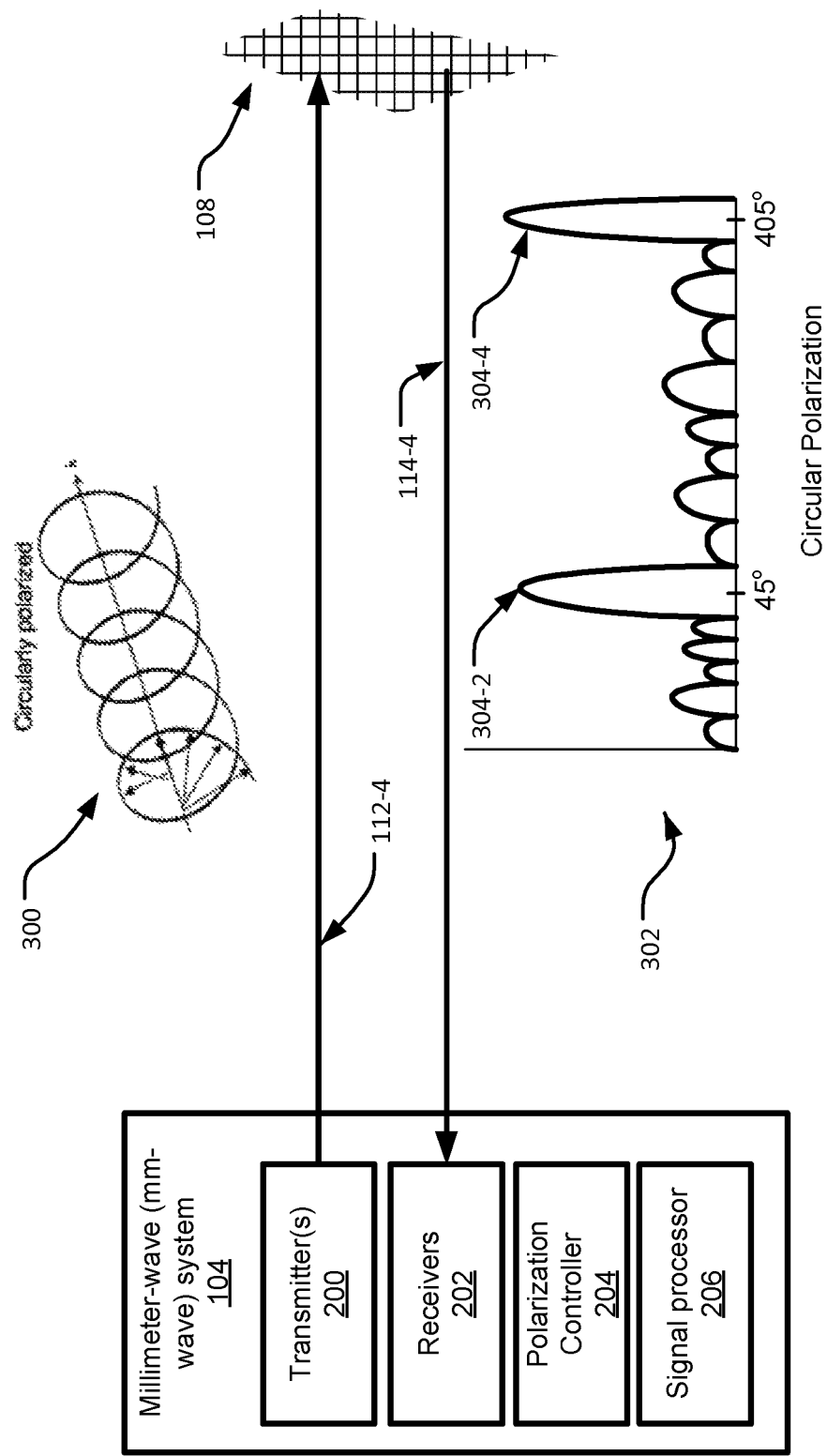
FIG. 3 illustrates an example detection of an object by a mm-wave system as described in present implementations herein.

FIG. 3 illustrates an example detection of an object by a mm-wave system as described in present implementations herein. Particularly, FIG. 3 shows the mm-wave system 104 that may be configured, for example, to perform an initial detection of the second object 108, which may include a fine mesh wire that is hard to detect especially at dense weather conditions. In this example, the transmitted mm-wave radar signal 112-4 may include a circularly polarized signal 300 that may be received and reflected by the second object 108. The circularly polarized signal 300, for example, may be generated by activating the first transmitter 200-2 and the second transmitter 200-4 that are pre-configured to be out of phase by 90° from each other. In another example, one of the transmitter of the plurality of transmitters 200 may be pre-configured to have a fixed circular polarization.

As shown, the transmitted circularly polarized signal 300 may be received by the second object 108 and thereafter reflected as signals 302, which may include intermittent peak signals 304 on a particular signal orientation of the circularly polarized mm-wave radar signal 112-4. For example, the return-mm-wave radar signal 114-4 which is represented by the signals 302 may include the peak signals 304 that may occur at about 45 degrees of every cycle. In this example, the signal processor 206 may utilize the peak signals 304 in determining the necessary signal orientation to use in determining the distance and location of the second object 108. That is, the circularly polarized signal 300 may be used initially to detect presence of the object and to determine the necessary signal polarization to use in determining the distance of the object from the mm-wave system 104.

Figure 4:
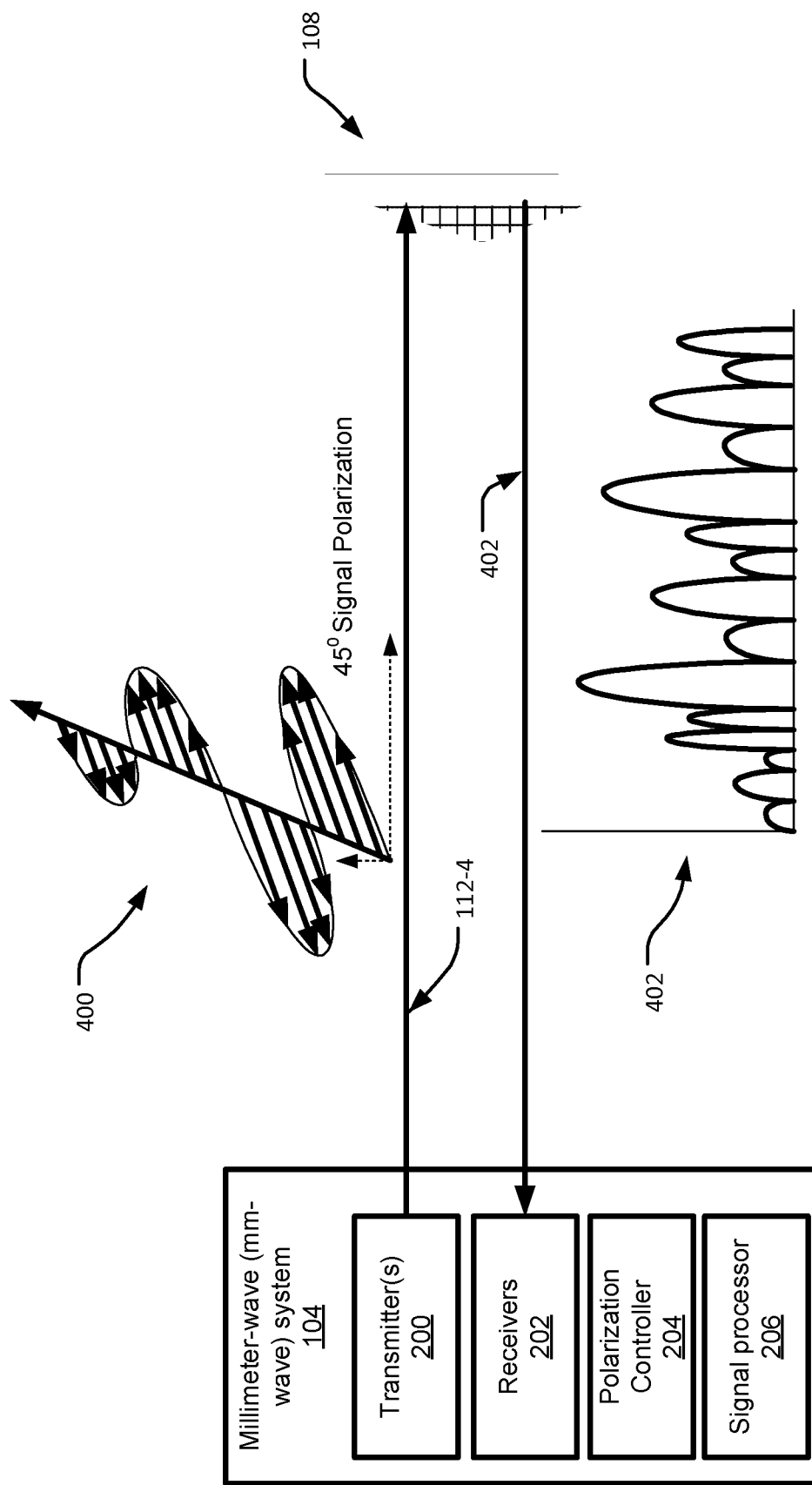
FIG. 4 illustrates an example use of multi-polarization signals by a mm-wave system as described in present implementations herein.

FIG. 4 illustrates an example use of multi-polarization signals by a mm-wave system as described in present implementations herein. The multi-polarization signals may include a combination of the horizontal and vertical signal polarizations to generate a particular amount of signal polarization by the plurality of transmitters 200.

Referring to FIG. 3 above where the signal processor 206 may utilize the peak signals 304 in determining the necessary signal orientation to use in determining the distance and location of the second object 108, the polarization controller 204 may utilize and combine, for example, both horizontal and vertical signal polarization from the first transmitter 200-2 and second transmitter 200-4, respectively, to generate, for example, a 45 degree-signal orientation 400. In this example, the combination of the horizontal and vertical signal polarization may adjust the E plane directions of the radiated electromagnetic fields to 45 degree-signal orientation, which includes the peak signals with higher SNR and of higher signal magnitude as discussed in FIG. 3 above. In this example still, rather than using an alternate horizontal or vertical signal orientation or polarization as discussed in FIG. 2 above, the mm-wave system 104 may be configured to use multi-signal polarization to detect and determine location of thin and small objects during dense weather conditions.

At the object end, the second object 108 may receive the transmitted mm-wave radar signals 112-4 that includes the 45 degree-signal orientation and thereafter, reflects a reflection signal 402, which may include reflected signals that have consistent high signal magnitudes with higher SNR.

Figure 5:
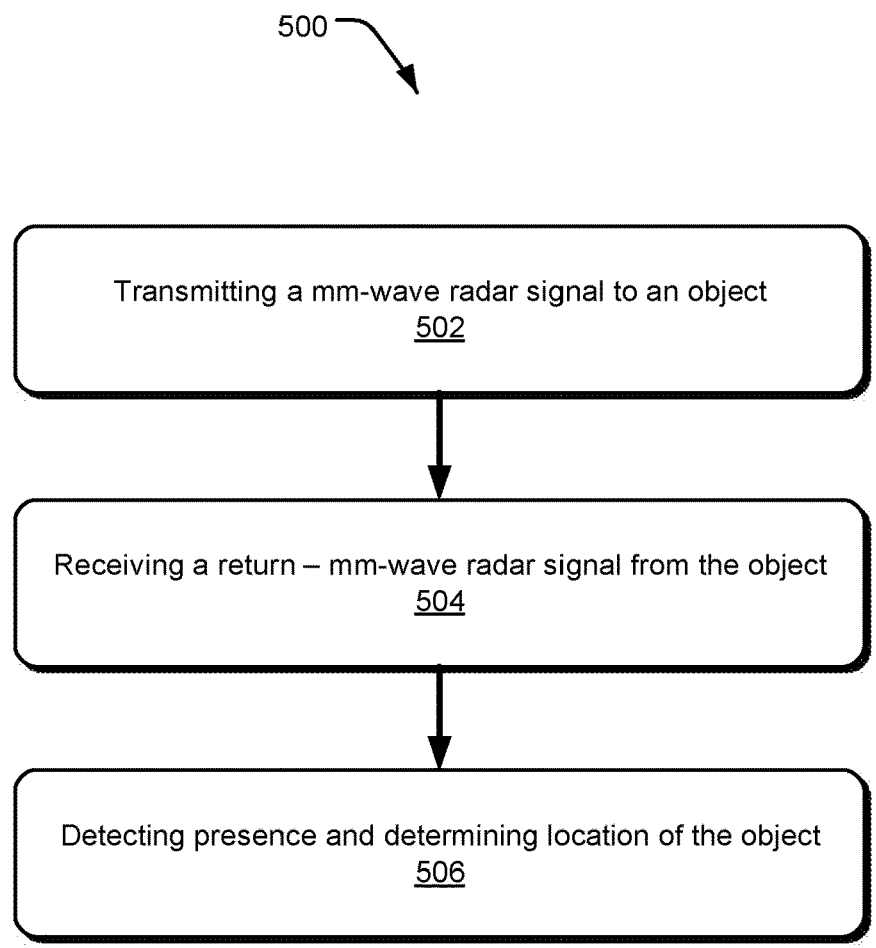
FIG. 5 is an example process chart illustrating an example method for detecting slim objects by a mm-wave system as described herein.

FIG. 5 shows an example process chart 500 illustrating an example method for detecting slim objects by a mm-wave system as described herein. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, transmitting a mm-wave radar signal by a plurality of transmitters to an object is performed. For example, the plurality of transmitters 200 of the mm-wave system 104 transmit mm-wave radar signals 112 to the direction of the object. In this example, the mm-wave radar signals 112 may include at least two signal orientations. That is, the at least two signal orientations may include a plurality of alternating horizontally and vertical polarized mm-wave radar signals. In other cases, the at least two signal orientations may further include different sequence-combinations of the horizontal and vertical signal polarizations.

At block 504, receiving of a return-mm-wave radar signal from the object by a plurality of receivers is performed. For example, the received return-mm-wave radar signal 114-2 may include signal reflections corresponding to each of the at least two signal orientations. That is, depending upon the configuration of the plurality of the transmitted mm-wave radar signals, the reflected signals of the return-mm-wave radar signal 114-2 may correspond to the signal polarization of the transmitted mm-wave radar signals 112-2.

At block 506, detecting and determining a location of the object by a processor is performed. The signal processor 206 may be configured to process the received horizontal polarization reflection signal 212 and the vertical polarization reflection signal 214 of the received return-mm-wave radar signal 114-2. For example, the signal processor 206 may determine which signal between the horizontal polarization reflection signal 212 and the vertical polarization reflection signal 214 may include a higher SNR. In this example, the signal polarization with the higher SNR (i.e., horizontal polarization reflection signal 212 or the vertical polarization reflection signal 214) may be utilized by the signal processor 206 to determine the location of the first object 106. In this example still, the signal processor 206 may send control signals that may be received by the polarization controller 204 in order to change the alternating signal polarization or orientation into a single signal orientation

What is claimed is:

1. A radar system comprising:
   a plurality of transmitters;
   a plurality of receivers; and
   a processor coupled to the plurality of transmitters and the plurality of receivers and configured to:
   transmit, via the plurality of transmitters, a first set of signals that includes a first signal with a first orientation within a group of orientations and a second signal with a second orientation within the group of orientations;
   receive, via the plurality of receivers, the first set of signals;
   detect an object based on the first set of signals;
   determine that the first signal with the first orientation has a greater signal-to-noise ratio than the second signal with the second orientation;
   provide, via the plurality of transmitters, a second set of signals that does not include any signal with the second orientation;
   receive, via the plurality of receivers, the second set of signals; and
   determine an attribute of the object based on the second set of signals.

2. The radar system of claim 1, wherein the attribute includes at least one of: a distance of the object and a location of the object.

3. The radar system of claim 1, wherein the second set of signals includes a third signal with the first orientation.

4. The radar system of claim 1, wherein the group of orientations includes horizontal polarization and vertical polarization.

5. The radar system of claim 1, wherein the group of orientations includes a circular polarization.

6. The radar system of claim 1, wherein the respective radar signal produced by each of the plurality of transmitters is within a frequency range of 76-81 GHz.

7. The radar system of claim 1 further comprising a polarization controller coupled to the plurality of transmitters and the plurality of receivers and configured to select a subset of the plurality of transmitters to provide the second set of signals and to select a subset of the plurality of receivers to receive the second set of signals.

8. A method comprising:
   transmitting a first set of radar signals including a first signal having a first signal orientation within a group of orientations and a second signal having a second signal orientation within the group of orientations;
   receiving the first set of radar signals;
   determining, based on the first set of radar signals, a subset of the group of orientations to use for a second set of radar signals;
   transmitting the second set of radar signals each having a signal orientation within the subset of the group of orientations;
   receiving the second set of radar signals; and
   determining an attribute of an object based on the second set of radar signals.

9. The method of claim 8, wherein the determining of the subset of the group of orientations to use for the second set of radar signals includes:
   determining that a signal-to-noise ratio of a first signal having a first orientation is better than a signal-to-noise ratio of a second signal having a second orientation; and
   determining the subset of the group of orientations to include the first orientation and to exclude the second orientation.

10. The method of claim 8 further comprising determining a presence of the object based on the first set of radar signals.

11. The method of claim 8, wherein the group of orientations includes horizontal polarization and vertical polarization.

12. The method of claim 8, wherein the group of orientations includes a circular polarization.

13. The method of claim 8, wherein each signal of the first set of radar signals and the second set of radar signals is within a frequency range of 76-81 GHz.

14. The method of claim 8, wherein:
the transmitting of the first set of radar signals includes transmitting a signal from each of a plurality of transmitters; and
the transmitting of the second set of radar signals includes transmitting a signal from each of a subset of the plurality of transmitters.

15. The method of claim 14, wherein:
the receiving of the first set of radar signals includes receiving a signal by each of a plurality of receivers; and
the receiving of the second set of radar signals includes receiving a signal by each of a subset of the plurality of receivers.

16. A circuit comprising:
a processor configured to couple to a plurality of radar transmitters and to a plurality of radar receivers and configured to:
cause the plurality of radar transmitters to transmit a first set of signals that includes a first signal with a first orientation within a set of orientations and a second signal with a second orientation within the group of orientations;
receive, via the plurality of radar receivers, the first set of signals;
determine a subset of the set of orientations for a second set of signals based on the first set of signals;
cause a subset of the plurality of radar transmitters to transmit the second set of signals;
receive, via a subset of the plurality of radar receivers, the second set of signals; and
determine an attribute of an object based on the second set of signals.

17. The circuit of claim 16, wherein the processor is configured to determine the subset of the set of orientations for the second set of signals such that the subset includes a first orientation associated with a first signal having a signal-to-noise ratio greater than a signal-to-noise ratio of a second signal associated with a second orientation and such that the subset excludes the second orientation.

18. The circuit of claim 16, wherein the processor is configured to determine a presence of the object based on the first set of signals.

19. The circuit of claim 16, wherein the attribute includes at least one of: a location of the object or a distance of the object.

20. The circuit of claim 16 further comprising the plurality of radar transmitters and the plurality of radar receivers.

* * * * *